(12) United States Patent   (10) Patent No.: US 7,994,844 B2
Chen et al.   (45) Date of Patent: Aug. 9, 2011

(54) MULTIPLE-STAGE CHARGE PUMP WITH CHARGE RECYCLE CIRCUIT

(75) Inventors: Chung-Kuang Chen, Pan Chiao (TW); Chun-Hsiung Hung, Hsinchu (TW); Yi-Te Shih, Zhubei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 12/770,989

(22) Filed: Apr. 30, 2010

(65) Prior Publication Data

US 2010/0219881 A1   Sep. 2, 2010

Related U.S. Application Data

(63) Continuation-in-part of application No. 11/938,314, filed on Nov. 12, 2007, now abandoned.

(51) Int. Cl.
*G05F 1/10* (2006.01)
(52) U.S. Cl. ........................................................ 327/536
(58) Field of Classification Search .................. 327/535, 327/536, 537
See application file for complete search history.

(56) References Cited

U.S. PATENT DOCUMENTS

| | | | |
|---|---|---|---|
| 5,818,289 A | 10/1998 | Chevallier et al. | |
| 6,008,690 A | 12/1999 | Takeshima et al. | |
| 6,154,088 A | 11/2000 | Chevallier et al. | |
| 6,307,425 B1 | 10/2001 | Chevallier et al. | |
| 6,359,798 B1 | 3/2002 | Han et al. | |
| 6,545,529 B2 | 4/2003 | Kim | |
| 7,116,154 B2 | 10/2006 | Guo | |
| 7,439,793 B2 | 10/2008 | Lee | |
| 7,449,944 B2 | 11/2008 | Byeon et al. | |

*Primary Examiner* — Jeffrey S Zweizig
(74) *Attorney, Agent, or Firm* — Thomas|Kayden

(57) ABSTRACT

A multiple-stage charge pump circuit comprises first and second pump capacitors, first and second transfer circuits, first and second driving circuits, and a charge recycle circuit. The first pump capacitor, the first transfer circuit, and the first driving circuit form a first stage circuit, and the second pump capacitor, the second transfer circuit and the second driving circuit form a second stage circuit. The first and the second stage circuits operate 180 degree out of phase with each other. The charge recycle circuit transfers the charge at the second end of the first pump capacitor to the second end of the second pump capacitor in a first time interval, and transferring the charge at the second end of the second pump capacitor to the second end of the first pump capacitor in a second time interval.

10 Claims, 6 Drawing Sheets

MULTIPLE-STAGE CHARGE PUMP WITH CHARGE RECYCLE CIRCUIT

This application is a continuation-in-part (CIP) application of the co-pending application Ser. No. 11/938,314, filed on Nov. 12, 2007.

BACKGROUND OF THE INVENTION

1. Field of the Invention

The invention relates in general to a multiple-stage charge pump, and more particularly to a multiple-stage charge pump with a charge recycle circuit.

2. Description of the Related Art

With the increasing development of technology, multiple-stage charge pump has been widely used in the circumstances for providing voltage exceeding the voltage of the circuit power supply, for example, to write and erase operation in EEPROM.

Referring to FIG. 1, a circuit diagram of a conventional multiple-stage charge pump is shown. The conventional multiple-stage charge pump 100 includes four stages 120 and each of the stages 120 includes a diode D and a pump capacitor C. Clock signals CK1 and CK2 are 180 degree out of phase with each other for respectively turning on the diodes of the odd stages and the diodes of the even stages in different time intervals, which are non-overlapped. When the diode D is turned on, the pump capacitor C connected to the N end of the diode D is charged by the voltage at the P end of the diode D. Then the voltage at the N end is elevated by the corresponding clock signal. After the four stages 120, an output voltage Vo is substantially 5 times a high voltage Vdd is obtained.

However, the conventional multiple-stage charge pump circuit has the disadvantages of high power consumption because the capacitor C is repeatedly charged and discharged. Therefore, how to provide a multiple-stage charge pump with lower power consumption and higher power efficiency is one of the efforts the industries are making.

SUMMARY OF THE INVENTION

The invention is directed to a multiple-stage charge pump circuit with lower power consumption and higher power efficiency in comparison to the conventional multiple-stage charge pump circuit.

According to an aspect of the present invention, a multiple-stage charge pump circuit is provided. The multiple-stage charge pump circuit comprises first and second pump capacitors, first and second transfer circuits, first and second driving circuits, and a charge recycle circuit. The first transfer circuit provides a high voltage to the first end of the first pump capacitor in a first time interval of a time period. The second transfer circuit provides the voltage at the first end of the first pump capacitor to the first end of the second pump capacitor in the second time interval of the time period. The first driving circuit pulls down the voltage at the second end of the first pump capacitor in the second time interval and pulls up the voltage thereat in the first time interval. The second driving circuit pulls down the voltage at the second end of the second pump capacitor in the first time interval and pulls up the voltage thereat in the second time interval. The charge recycle circuit transfers the charge at the second end of the first pump capacitor to the second end of the second pump capacitor in the third and the fourth time interval. The first to the fourth time intervals are non-overlapped and the third and the fourth time intervals come after the second and the first time intervals, respectively.

The invention will become apparent from the following detailed description of the preferred but non-limiting embodiments. The following description is made with reference to the accompanying drawings.

DETAILED DESCRIPTION OF THE INVENTION

The present invention provides a multiple-stage charge pump circuit which uses a charge recycle circuit for transferring charge stored in a charge pump stage circuit to another charge pump stage circuit through a short circuit path formed by the charge recycle circuit, so as to reuse the charge.

Figure 1:
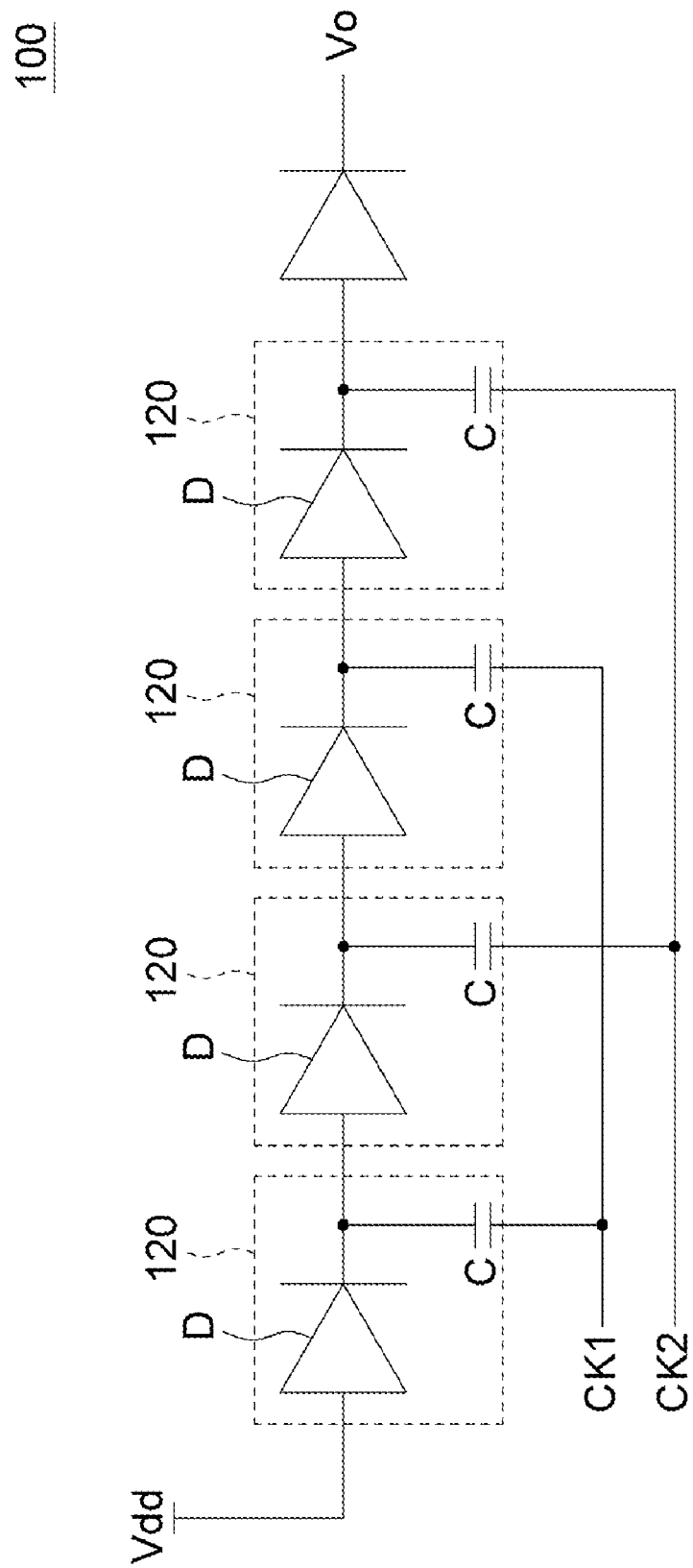
FIG. 1 shows a circuit diagram of a conventional multiple-stage charge pump.
Figure 2:
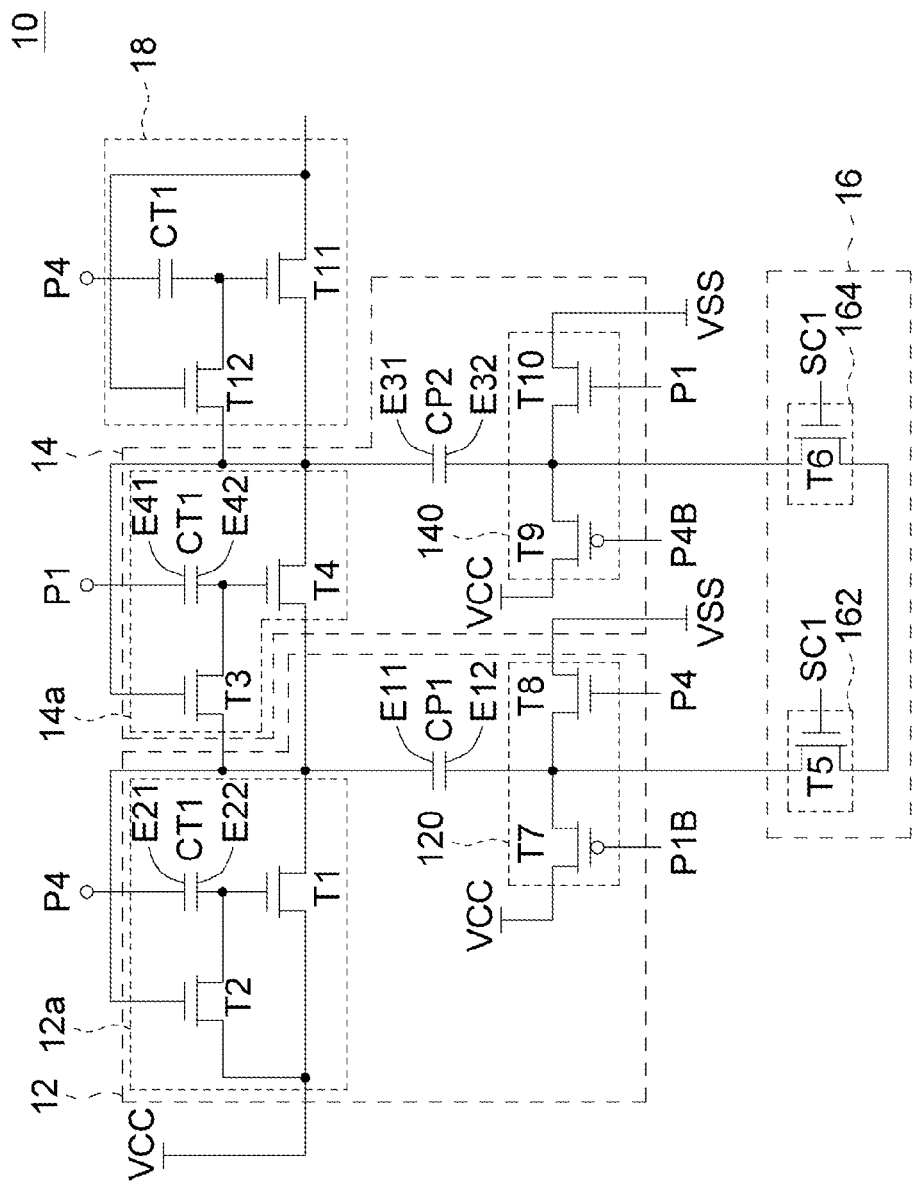
FIG. 2 shows a circuit diagram of the multiple-stage charge pump circuit of the embodiment.
Figure 3:
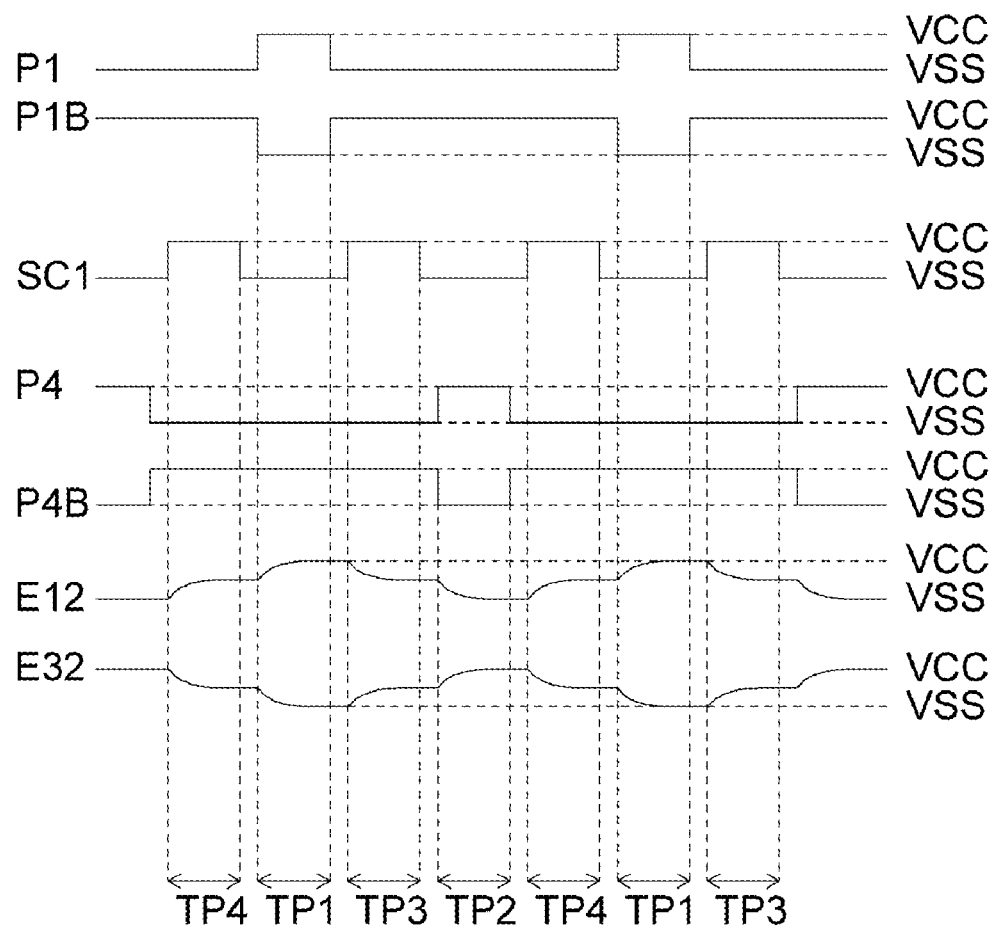
FIG. 3 shows a waveform diagram of the signals in FIG. 2.

Referring to FIG. 2 and FIG. 3, a circuit diagram of the multiple-stage charge pump circuit of the embodiment and a waveform diagram of the signals in FIG. 2 are respectively shown. The multiple-stage charge pump circuit 10 comprises stage circuits 12, 14, and a charge recycle circuit 16. The first stage circuit 12 includes a transfer circuit 12a, a pump capacitor CP1, and a voltage driving circuit 120. The transfer circuit 12a includes a transfer capacitor CT1 and transistors T1, T2.

The pump capacitor CP1 has first end E11 and second end E12. The transfer capacitor CT1 has first end E21 and second end E22. The first and the second transistors T1 and T2 are, for example, N-type metal oxide semiconductor (MOS) transistors. The drains of the first and the second transistors T1 and T2 receive a high voltage VCC, the gates of them are respectively coupled to the second end E22 and the first end E21, and the sources of them are respectively coupled to the first end E11 and the second end E22. The second end E12 is coupled to the voltage driving circuit 120 and the first end E21 receives a clock signal P4.

In a time interval TP1, the voltage driving circuit 120 provides a high voltage VCC to the second end E12 so as to pull the voltage at the first end E11 high. The transistor T2 is turned on based on the high voltage at the first end E11. When the transistor T2 is turned on in the time interval TP1, the high voltage VCC is provided to the second end E22 via the transistor T2. The clock signal P4 is equal to a low voltage VSS in the time interval TP1.

In a time interval TP2, the clock signal P4 rises from the low voltage VSS to the high voltage VCC. Because the voltage difference between the first and the second ends E21 and E22 remains unchanged, the voltage at the second end E22 raises from the high voltage VCC to a voltage substantially two times the voltage of the high voltage VCC. The transistor T1 is turned on and provides the high voltage VCC to the first end E11 because the voltage at the second end E22 (=2VCC) is higher than the voltage at the first end E11 (VCC). The voltage driving circuit 120 provides the low voltage VSS to the second end E12 in the time interval TP2 so as to pull down the voltage at the second end E12 to the low voltage VSS. As a result, the voltage difference between the first and the second ends E11 and E12 is equal to the voltage (VCC−VSS).

The low voltage VSS, for example, equals to the ground level and the voltage difference between the first and the second ends E11 and E12 is equal to the high voltage VCC.

As the voltage at the second end E12 is elevated to the high voltage VCC in the next time interval TP1, the voltage at the first end E11 is elevated by the high voltage VCC and is equal to a voltage two times the voltage of the high voltage VCC.

The second stage circuit 14 includes a transfer circuit 14a, a pump capacitor CP2, and a voltage driving circuit 140. The transfer circuit 14a includes a transfer capacitor CT2 and transistors T3, T4. The transistors T3 and T4 are N-type MOS transistors. The pump capacitor CP2 has first end E31 and second end E32. The transfer capacitor CT2 has first end E41 and second end E42. The operation of the second stage circuit 14 is similar to the operation of the first stage 12. The second stage circuit 14 provides the voltage at the first end E11 two times the voltage of the high voltage VCC to the first end E31, elevates the voltage at the first end E31 by the high voltage VCC, and generates a voltage three times the voltage of the high voltage VCC.

In the multiple-stage charge pump circuit 10 of the embodiment, the first and the second stage circuits 12 and 14 operate based on clock signals P4 and P1. The voltage of the second end E12 is pulled up to the high voltage VCC in the time interval TP1 and is pulled low to the low voltage VSS in the time interval TP2. The voltage of the second end E32 is pulled down to the low voltage VSS in the time interval TP1 and is pulled up to the high voltage VCC in the time interval TP2.

In this embodiment, the charge recycle circuit 16 is applied to recycle the charge from one of the second ends E12 and E32 with the high voltage VCC to the other with the low voltage VSS. The charge recycle circuit 16 of the embodiment is for connecting the second ends E12 and E32 in a time interval TP3 and a time interval TP4 of the period. The time intervals TP3 and TP4 respectively come after the time intervals TP1 and TP2.

In the time interval TP3, the voltages at the second ends E12 and E32 are respectively close to the high voltage VCC and the low voltage VSS and the first and the second voltage driving circuits 120 and 140 are both disabled. Thus, the path from the second end E12 to second end E32 through the charge recycle circuit is formed. Therefore, in the time interval TP3, the charge at the second end E12 with the high voltage VCC is recycled and transferred to the second end E32 with the low voltage VSS, rather than directly discharged to the ground.

In the time interval TP4, the voltages at the second end E32 and E12 are respectively close to the high voltage VCC and the low voltage VSS and the first and the second voltage driving circuits 120 and 140 are both disabled. Thus, the path from the second end E32 to second end E12 through the charge recycle circuit is formed. Therefore, in the time interval TP4, the charge at the second end E32 with the high voltage VCC is recycled and transferred to the second end E12 with the low voltage VSS, rather than directly discharged to the ground.

In the embodiment, the charge recycle circuit 16 comprises switch circuits 162 and 164. The switch circuits 162 and 164 include first ends and second ends. The first ends of the switch circuit 162 and 164 are respectively coupled to the second end E12 and E32, and the second ends of the switch circuits 162 and 164 are coupled to each other. The switch circuits 162 and 164 are turned on in the time intervals TP3 and TP4 for coupling the second ends E12 and E32.

The switch circuits 162 and 164 respectively include transistors T5 and T6. The transistor T5 and T6 are, for example, N-type MOS transistors. The drains of the transistors T5 and T6 are the first end of the switch circuits 162 and 164 coupled to the second end E12 and E32, respectively. The source of the transistors T5 and T6 are the second ends of the switch circuits 162 and 164 for coupled to each other. The gate of the transistors T5 and T6 receives a control signal SC1. The control signal SC1 is equal to the high voltage VCC in the time intervals TP3 and TP4. The transistors T5 and T6 are turned on based on the high control signal SC1 in the time intervals TP3 and TP4.

The voltage driving circuit 120 includes transistors T7 and T8. The transistors T7 and T8 are, for example, a P-type MOS transistor and an N-type MOS transistor, respectively. The drains of the transistors T7 and T8 are respectively connected to the second end E12 and E32. The sources of the transistors T7 and T8 respectively receive the high voltage VCC and the low voltage VSS. The transistors T7 and T8 are for providing paths for pulling up and pulling down the voltage at the second end E12 based on the low level of a clock signal P1B and the high level of the clock signal P4, respectively, wherein the clock signal P1B is the inverse clock signal of the clock signal P1.

The voltage driving circuit 140 has a similar circuit structure as the voltage driving circuit 120. The voltage driving circuit 120 includes transistors T9 and T10. The transistors T9 and T10 are, for example, respectively a P-type MOS transistor and an N-type MOS transistor. The transistors T9 and T10 is for pulling up and pulling down the voltage at the second end E32 based on the low level of a clock signal P4B and the high level of the clock signal P1, respectively. The clock signal P4B is an inverse signal of the clock signal P4.

The multiple-stage charge pump circuit 10 further includes an output stage circuit 18 for receiving and outputting the voltage at the first end E31 as an output voltage VO. The output stage circuit 18 includes transistors T11, T12 and a transfer capacitor CT3, which have substantially the same circuit connection as the transistors T1, T2 and the transfer capacitor CT1. Therefore, the output stage 18 can effectively output the output voltage VO without voltage drop of the threshold voltage of the transistor T11. The output stage 18 can operate as a diode for preventing the output voltage VO from generating current flowing backward to the first end E31 as the voltage thereat is lower than three times of the high voltage VCC.

The effect of charge sharing operation performed in the time intervals TP3 and TP4 is explained in the following. In the time interval TP1 before the time interval TP3, the voltage at the second end E12 and end E32 are the high voltage VCC and the low voltage VSS, respectively. Since the voltage at the second end E12 and E32 will be respectively pulled down and pulled high in the time interval TP2 after the time interval TP3, recycling the charge stored at the end E12 to the end E32 can effectively lower the power consumption needed to directly pull down and pull up the voltage at the second end E12 and E32. The operation in the time interval TP2 before the time interval TP4 is similar to the operation in the time interval TP1, which can effectively lower the power consumption needed to directly pull down and pull up the voltage at the second end E32 and E12. Therefore, the multiple-stage charge pump circuit has the advantages of lower power consumption and higher power efficiency in comparison to the conventional multiple-stage charge pump circuit.

Figure 4:
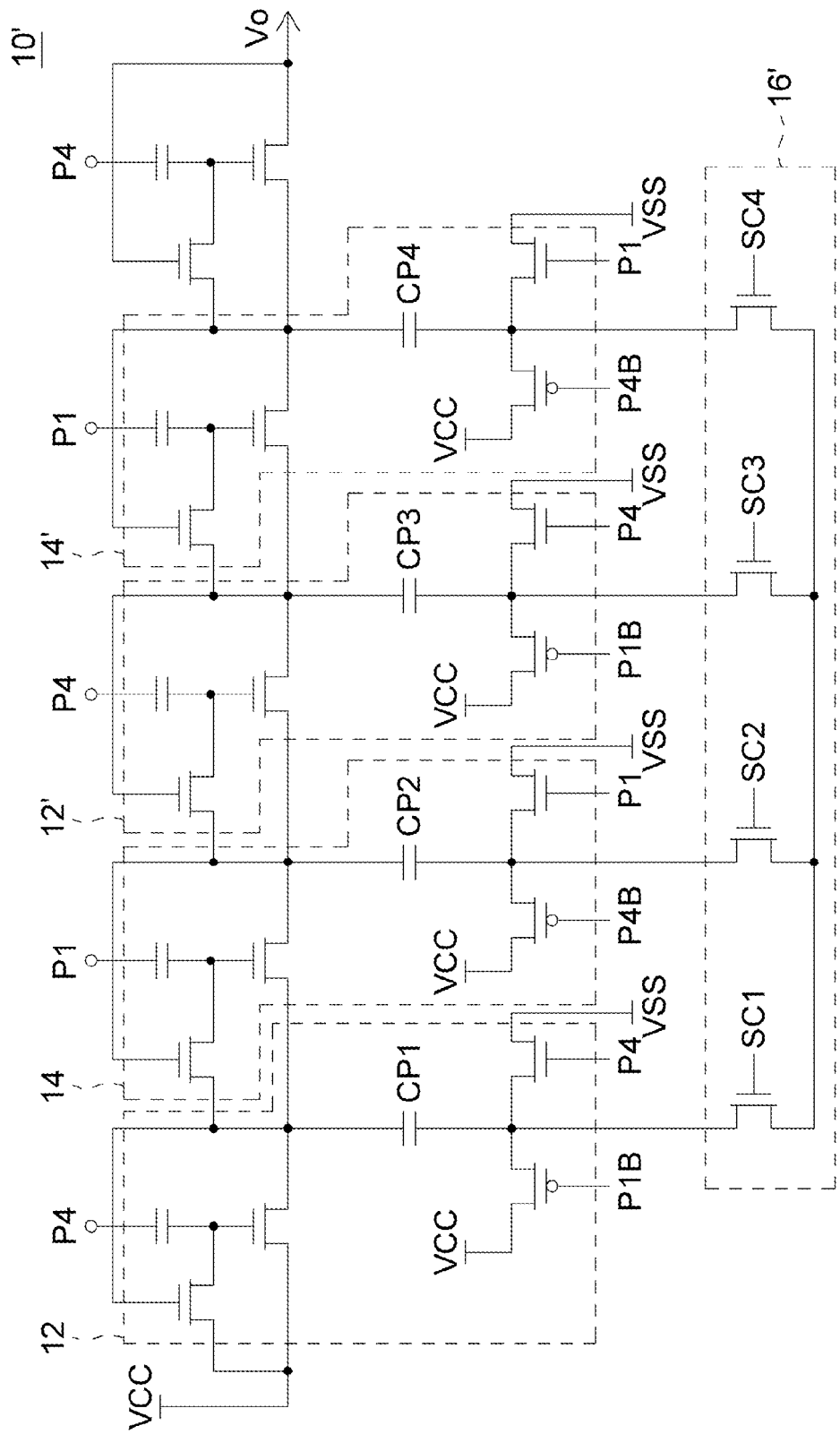
FIG. 4 shows another circuit diagram of the multiple-stage charge pump of the embodiment.

Although the multiple-stage charge pump circuit 10 is exemplified to have the first and the second stage circuits 12 and 14, the multiple-stage charge pump circuit 10 is not limited to have two stage circuits and can further include four or more than four stage circuits. For example, referring to FIG. 4, another circuit diagram of the multiple-stage charge pump of the embodiment is shown. The multiple-stage charge pump circuit 10' differs from the multiple-stage charge pump circuit 10 in that the multiple-stage charge pump circuit 10' further includes third and fourth stage circuits 12' and 14', the charge recycle circuit 16' includes four transistors M1~M4 correspondingly coupled to the stage circuits 12, 14, 12' and 14', and the transistors M1~M4 are respectively controlled by different control signals SC1~SC4.

The circuit connection and the operation of the first and the third stage circuits 12 and 12' are substantially the same. The circuit connection and the operation of the second and the fourth stage circuits 14 and 14' are substantially the same. Therefore, the multiple-stage charge pump 10' can effectively provide output voltage VO' five times of the high voltage VCC. The charge recycle circuit 16' is for connecting all the second ends of the pump capacitors CP1 to CP4 in the time intervals TP3 and TP4 for transferring the charge. In the charge recycle interval TP3 or TP4, the transistors M1~M4 can be respectively turned on by the control signals SC1~SC4 at the same time for charge sharing just like in the case of the above-mentioned multi-stage charge pump 10, or only a portion of the transistors M1~M4 are turned on and the other portion of the transistors M1~M4 are turned off for charge sharing among the pump capacitors CP1~CP4 coupled to the turned-on transistors M1~M4.

For example, in the time interval TP3 when the pump capacitors CP1 and CP3 have the VDD level, and the pump capacitors CP2 and CP4 have the ground level, the transistors M1~M4 are all turned on by the control signals SC1~SC4 (e.g. at the VDD level), the two VDD levels of the pump capacitors CP1 and CP3 are equally distributed and shared among the four stage circuits 12, 14, 12' and 14' via the turned-on transistors M1~M4. As a result of the charge sharing, the level of each capacitor CP1~CP4 is 2*VDD/4=VDD/2 and the transfer ratio is 1/2.

In the time interval TP3, if only the three transistors M1, M3 and M4 are turned on by the control signals SC1, SC3 and SC4 and the transistor M2 is turned off by the control signal SC2 (e.g. at the ground level), the two VDD levels of the pump capacitors CP1 and CP3 can be equally distributed and shared among the three stages 12, 12' and 14' via the turned-on transistors M1, M3 and M4. As a result, the level of each capacitor CP1, CP3 or CP4 is 2*VDD/3 and the transfer ratio is 2/3. Similarly, if the transistor M4 is turned off and the transistor M1~M3 are turned on in the time interval TP3, after the charge sharing, the level of each capacitor CP1~CP3 is 2*VDD/3 and the transfer ratio is also 2/3.

If the multiple-stage charge pump circuit has N(=2n) stage circuits (n is a positive integer not smaller than 2), the charge recycle circuit has N switch elements (e.g. transistors) correspondingly coupled to the N stage circuits and controlled by different control signals. In the charge recycle interval, the pump capacitors of n stage circuits have the high voltage (VDD) level and the pump capacitors of the other n stage circuits have the ground level. By turning on b switch elements coupled to the pump capacitors having the VDD level, turning off (n−b) switch elements coupled to the other pump capacitors having the VDD level, turning on c switch elements coupled to the pump capacitors having the ground level and turning off the (n−c) switch elements coupled to the other pump capacitors having the ground level, after the charge sharing, the level of each pump capacitor coupled to the (b+c) turned-on switch elements is b*VDD/(b+c), and the transfer ratio is equal to b/(b+c), wherein b, c, (n−b), (n−c) are all positive integers. Therefore, by using different control signals to control the switch elements of the charge recycle circuit so that only a portion of the switch elements are turned on and the other portion of the switch elements are turned off, different charge transfer ratio can be obtained in the charge recycle interval to achieve different charge sharing effects.

Figure 5:
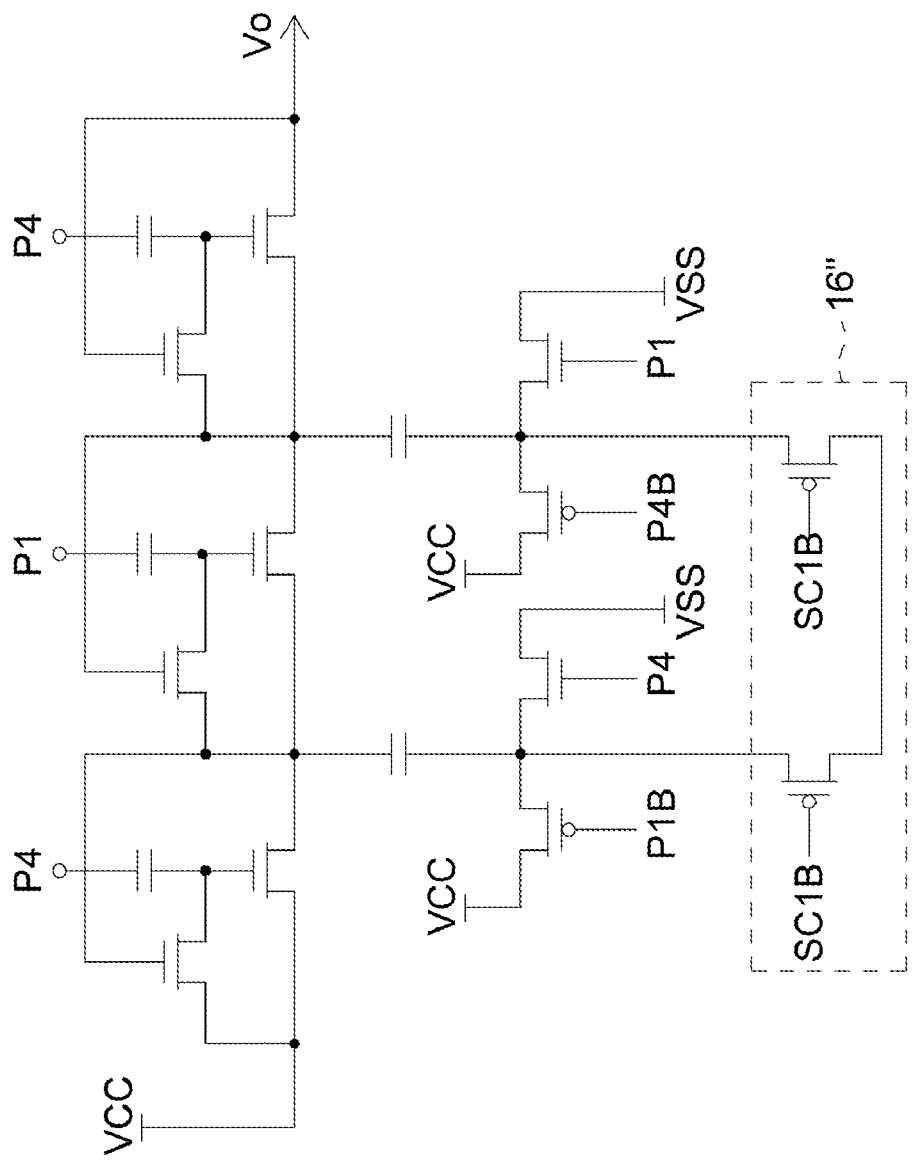
FIG. 5 shows another circuit diagram of the multiple-stage charge pump of the embodiment.
Figure 6:
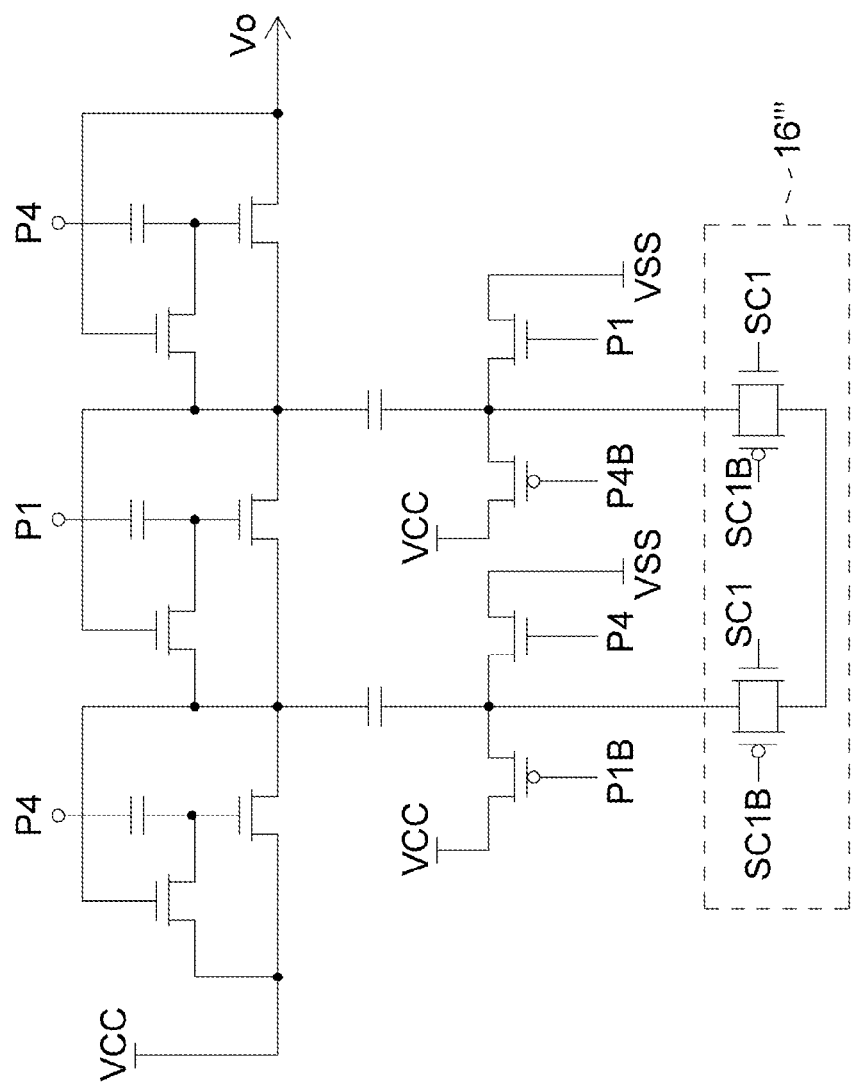
FIG. 6 shows another circuit diagram of the multiple-stage charge pump of the embodiment.

Although the charge recycle circuit 16 is exemplified to include N-type MOS transistors T5 and T6 and connect the second ends E12 and E32 through them, the charge recycle circuit 16 is not limited thereto and can use other kind of transistors to connect the second ends E12 and E32. For example, as shown in FIG. 5, the charge recycle circuit 16" can include and use P-type MOS transistors to connect the second ends E12 and E32, wherein the control signal SC1B is the inverse signal of the control signal SC1. Or, as shown in FIG. 6, the charge recycle circuit 16" can even include and use complimentary MOS transistors circuit to connect the second ends E12 and E32.

The multiple-stage charge pump circuit includes a charge recycle circuit for connecting the second end of the pump capacitors of the first and the second stage circuits to each other, so as to elevate the voltage at one of the second end of the pump capacitors based on the charge transferred from the other one. Therefore, the multiple-stage charge pump circuit has the advantages of lower power consumption and higher power efficiency in comparison to the conventional multiple-stage charge pump circuit.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multiple-stage charge pump circuit, comprising:
   a plurality of pumping stages, each pumping stage comprising a pumping circuit; and
   a charge recycle circuit, comprising a plurality of switch elements correspondingly coupled to the pumping circuits, wherein the switch elements are respectively controlled by a plurality of different control signals.

2. The multiple-stage charge pump circuit according to claim 1, wherein in a charge recycle interval, a portion of the switch elements are selectively turned on and the other portion of the switch elements are selectively turned off so that charges are shared among the pumping stages with a different transfer ratio.

3. The multiple-stage charge pump circuit according to claim 1,
   wherein the plurality pumping stages comprise: a first pumping stage, comprising:
      a first transistor, having a first terminal receiving a first voltage and a control terminal in response to a first clock signal; and
      a second transistor, having a first terminal receiving the first voltage, a control terminal receiving a second clock signal, and a second terminal coupled to a second terminal of the first transistor;
   a second pumping stage, coupled next to the first pumping stage, wherein the second pumping stage comprises:
      a third transistor, having a first terminal coupled to the second terminal of the first transistor, and a control terminal in response to a third clock signal, wherein the third clock signal is an inverted signal of the second clock signal; and
      a fourth transistor, having a first terminal receiving the first voltage, a control terminal receiving a fourth clock signal, and a second terminal coupled to a second terminal of the third transistor, wherein the fourth clock signal is an inverted signal of the first clock signal.

4. The multiple-stage charge pump circuit according to claim 3, wherein the first pumping stage further comprises a fifth transistor and a first capacitor, the fifth transistor comprises a first terminal coupled to the first terminal of the first transistor, a control terminal coupled to the second terminal of the first transistor and a second terminal coupled to the control terminal of the first transistor, the first capacitor has a first end coupled to the control terminal of the first transistor and a second end receiving the first clock signal, the second pumping stage further comprises a sixth transistor and a second capacitor, the sixth transistor comprises a first terminal coupled to the first terminal of the third transistor, a control terminal coupled to the second terminal of the third transistor and a second terminal coupled to the control terminal of the third transistor, the second capacitor has a first end coupled to the control terminal of the third transistor and a second end receiving the third clock signal.

5. The multiple-stage charge pump circuit according to claim 4, wherein the first pumping stage further comprises a seventh transistor having a first terminal coupled to the second terminal of the second transistor, a control terminal receiving the first clock signal and a second terminal coupled to a second voltage, the second pumping stage further comprises an eighth transistor having a first terminal coupled to the second terminal of the fourth transistor, a control terminal receiving the third clock signal and a second terminal coupled to the second voltage.

6. The multiple-stage charge pump circuit according to claim 5, wherein the first, the third, the fifth, the sixth, the seventh and the eighth transistors are N-type metal oxide semiconductor (NMOS) transistors, the second and the fourth transistors are P-type metal oxide semiconductor (PMOS) transistors, the first voltage is a high voltage, and the second voltage is a low voltage.

7. The multiple-stage charge pump circuit according to claim 3, wherein the first pumping stage further comprises a first pump capacitor having a first end coupled to the second terminal of the first transistor and a second end coupled to the second terminal of the second transistor, the second pumping stage further comprises a second pump capacitor having a first end coupled to the second terminal of the third transistor and a second end coupled to the second terminal of the fourth transistor.

8. The multiple-stage charge pump circuit according to claim 3, wherein the plurality of switch elements comprise a first switch element and a second switch element, the first switch element has a first terminal coupled to the second terminal of the second transistor, a control terminal receiving a first control signal, the second switch element has a first terminal coupled to the second terminal of the fourth transistor, a control terminal receiving a second control signal and a second terminal coupled to a second terminal of the first switch element.

9. The multiple-stage charge pump circuit according to claim 1, wherein the switch elements are transistors.

10. The multiple-stage charge pump circuit according to claim 1, wherein the number of the pumping stages are N(=2n), n is a positive number not smaller than 2, and each of the pumping circuit comprises a pump capacitor correspondingly coupled to one of the switch elements, in the charge recycle interval, b of the switch elements coupled to the pump capacitors having a ground voltage are turned on, the other (n−b) switch elements coupled to the pump capacitors having the ground voltage are turned off, c of the switch elements coupled to the pump capacitors having a high voltage VDD are turned on, the other (n−c) switch elements coupled to the pump capacitors having the high voltage VDD are turned off, after charge sharing, each of the pump capacitors coupled to the turned-on switch elements has a level b*VDD/(b+c), wherein b, c, (n−b) and (n−c) are positive integers.

* * * * *